United States Patent
Hung et al.

(10) Patent No.: US 6,606,282 B2
(45) Date of Patent: Aug. 12, 2003

(54) LONG SEEK CONTROL SYSTEM AND METHOD IN AN OPTICAL STORAGE DEVICE

(75) Inventors: Wei-Chou Hung, Taipei (TW); Chih Long Dai, Taipei (TW)

(73) Assignee: Acer Laboratories Inc., Taipei (TW)

( * ) Notice: Subject to any disclaimer, the term of this patent is extended or adjusted under 35 U.S.C. 154(b) by 58 days.

(21) Appl. No.: 09/988,656

(22) Filed: Nov. 20, 2001

(65) Prior Publication Data

US 2002/0196715 A1 Dec. 26, 2002

(30) Foreign Application Priority Data

Jun. 18, 2001 (TW) ........................................ 90114780 A (51) Int. Cl.[7] .............................................. G11B 21/08
(52) U.S. Cl. ................................... 369/30.15; 369/30.17
(58) Field of Search ........................... 369/30.13, 30.17, 369/44.25, 44.27, 44.35, 30.14, 30.16, 30.12, 30.27, 44.28; 360/78.06, 78.07, 78.09, 78.05

(56) References Cited

U.S. PATENT DOCUMENTS

| 4,955,009 A | * | 9/1990 | Nakatsu et al. | .......... 369/30.13 |
| 5,675,558 A | * | 10/1997 | Katoh | ...................... 369/30.15 |
| 5,739,972 A | * | 4/1998 | Smith et al. | .............. 360/77.03 |

* cited by examiner

*Primary Examiner*—Ali Neyzari
(74) *Attorney, Agent, or Firm*—Rabin & Berdo, P.C.

(57) ABSTRACT

The long seek control system and method include a reference velocity mapping unit that obtains a reference velocity when the dual actuator is moved by the residual track count; a velocity estimator for outputting an estimated velocity and obtaining a sled control effort by subtracting the estimated velocity from the reference velocity; and an electrical damper for receiving the sled control effort and simultaneously receiving the displacement of the dual actuator to output a damping control effort to the fine actuator, and reduce the vibration of the fine actuator during the long seek operation. In the reference velocity mapping unit, a reference velocity curve is used to describe the mapping relation between the residual track count and the reference velocity. The reference velocity curve includes a linear part and several quadratic parts with different quadratic functions.

13 Claims, 6 Drawing Sheets

LONG SEEK CONTROL SYSTEM AND METHOD IN AN OPTICAL STORAGE DEVICE

BACKGROUND OF THE INVENTION

This application incorporates by reference Taiwanese application Serial No. 90114780, Filed Jun. 18, 2001.

1. Field of the Invention

This invention relates to a long seek control system and method, and more particularly, to a long seek control system and method in an optical storage device.

2. Description of Related Art

As the need of storage medium with high capacity greatly increases, optical storage devices now play an essential role. It has been a critical issue to reduce the data access time when reading data from the optical disc.

In a conventional optical drive, a disc is disposed on a spindle motor, which rotates the disc. The disc has multiple tracks for storing digital information, which is read by an optical pickup head. The optical pickup head is disposed on a sled. A sled driving motor can drive the sled, whereby the pickup head can reach the desired position for reading information of the disc.

The reading process of an optical drive includes the following steps. First, after turning on the optical drive, the optical disc is rotated by the spindle motor. Then, the optical pickup head is moved to the inner ring of the optical disc. After that, a focus servo of the optical drive is activated to emit a laser beam and focus the laser beam to form a laser spot on the optical disc. Then, a tracking servo of the optical drive is activated to move a lens of the optical pickup head and let the laser spot follow a single information track. After that, a track number is read out to know the present location of the optical pickup head. Next, a long seek operation is performed, that is, the seek servo of the optical drive is activated to move the optical pickup head from the present track to the vicinity of the target track. Then, the tracking operation is performed and the optical pickup head reads its present track number for knowing the difference from the target track number. Then, a short seek operation is performed, that is, the lens is moved with fine adjustment on its location to move the laser spot to the target track. Then, tracking operation is activated and the data of the optical disc is read out.

In the foregoing descriptions, the long seek operation of the optical drive is the main factor that affects the averaged seek time. During the long seek operation, the optical pickup head must fast accelerate or decelerate to reduce the seek time. Furthermore, during the moving operation of the optical pickup head, the vibration of the optical pickup head should be avoided to reduce the focus loss. Even more, during the long seek operation, the problem of track count missing should be also avoided to reduce the error between the track number of the optical pickup head and the target track number. All the above factors are necessary to be considered when the long seek system is designed.

Figure 1:
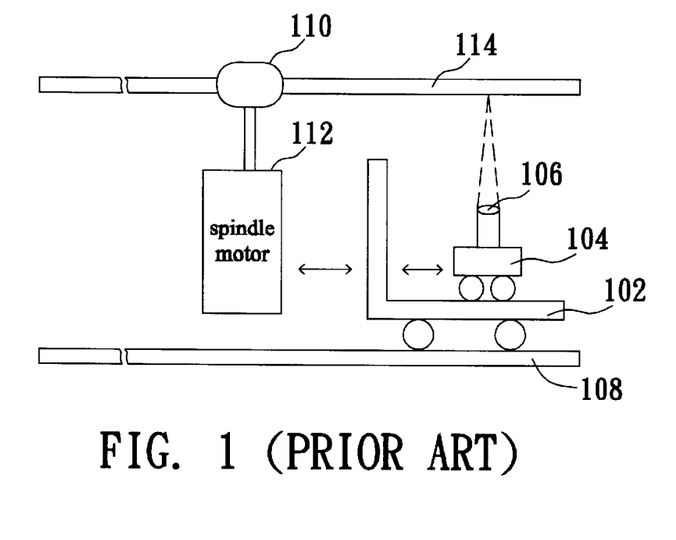
FIG. 1 illustrates the dual actuator system used in a long seek operation.

FIG. 1 schematically illustrates the dual actuator system used in a long seek operation. In FIG. 1, the dual actuator system used in the long seek operation is composed of a sled actuator 102 and a fine actuator 104. A lens 106 of the optical pickup head (not shown) is mounted on the fine actuator 104. During the seeking operation, the sled actuator 102 moves the fine actuator 104 back and forth on the actuator track 108, so as to let the lens 106 remain at the central of moving range of the fine actuator 104. A proper control on the sled actuator 102 and the fine actuator 104 is necessary to assure that the laser spot can be precisely projected onto the optical disc 114, which is affixed on the damper 110 and driven by the spindle motor 112. The sled actuator 102 usually is a sled motor, and the fine actuator 104 usually is a voice coil motor (VCM). The lens 106 is coupled to the sled through a spring coil of the VCM.

Figure 2:
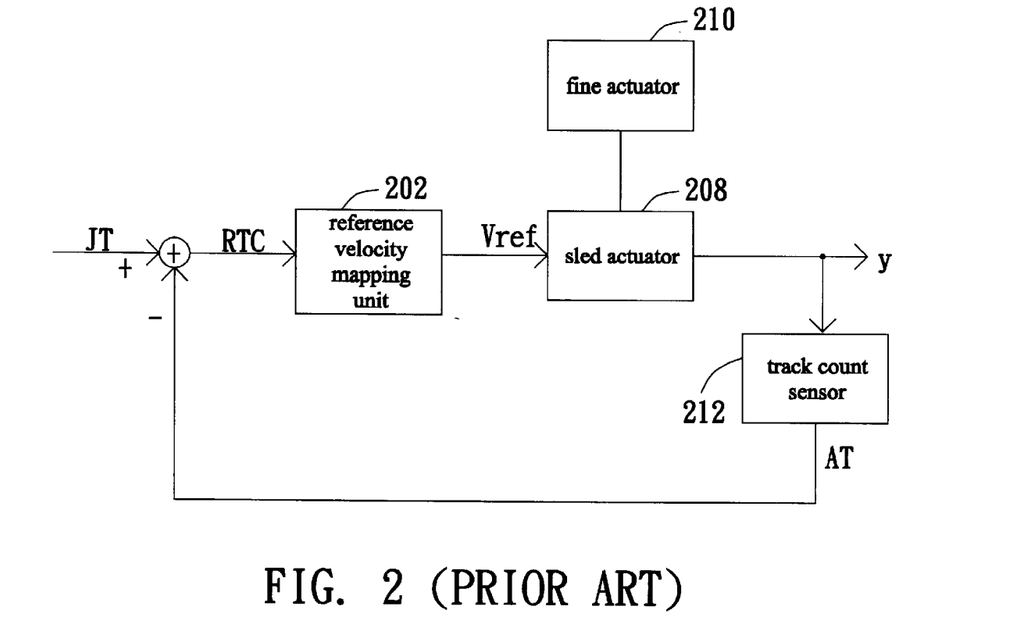
FIG. 2 illustrates a conventional long seek control system.

FIG. 2 schematically illustrates a conventional long seek control system. In FIG. 2, after the target track (JT) is inputted to the system, a subtraction between the target track and the actual track (AT) is done, and a residual track count (RTC) is obtained. The RTC is inputted to reference velocity mapping unit 202 and output a reference velocity Vref, which serves as a reference for the optical pickup head during reading information. The reference velocity Vref is inputted to a sled actuator 208. The fine actuator 210 is used to adjust the location of the lens. The sled actuator 208 is used to move the sled (not shown in FIG. 2). The actual track AT is generated by a track count sensor 212 according to the displacement y of the dual actuator. The track count sensor 212, for example, uses the signals of radio frequency zero crossing (RFZC) or tracking error zero crossing (TEZC) generated by the optical pickup head to obtain the actual track AT.

Figure 3:
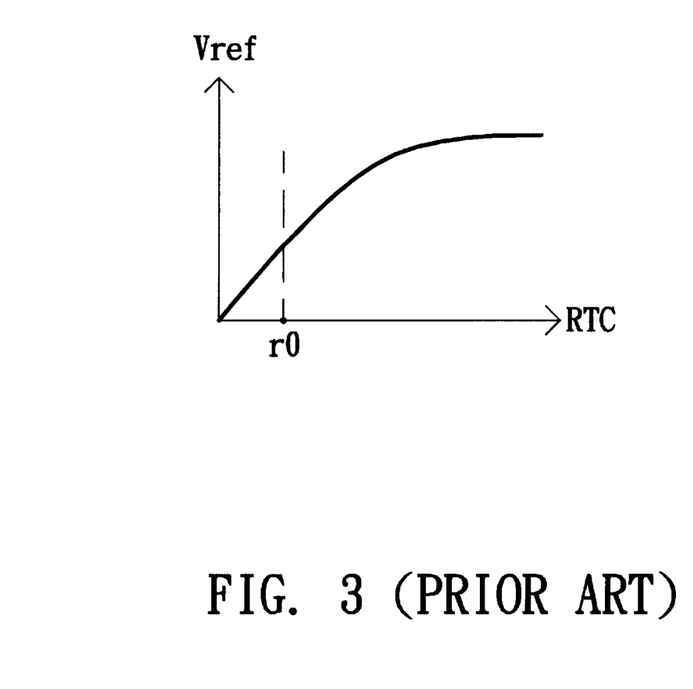
FIG. 3 illustrates a curve of reference velocity versus the residual track count RTC.

The reference velocity curve used by the reference velocity mapping unit 202 in the conventional long seek control system is shown in FIG. 3. The horizontal axis of FIG. 3 is the residual track count RTC and the vertical axis of FIG. 3 is the reference velocity Vref of the dual actuator. When the RTC is less than r0, the mapping relation between the RTC and the reference velocity Vref is linear. When the RTC is greater than r0, the mapping relation between the RTC and the reference velocity Vref is a quadratic function.

Figure 4:
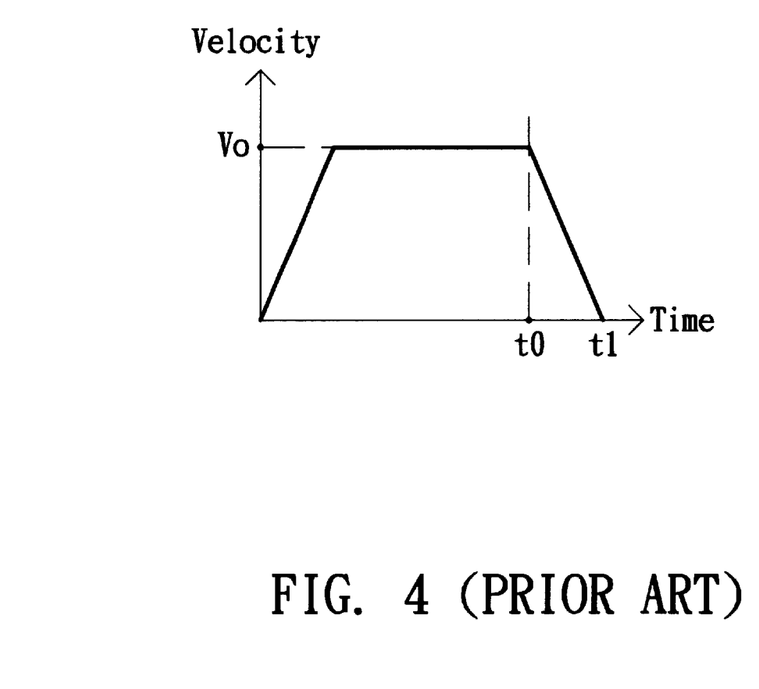
FIG. 4 illustrates a curve of reference velocity in FIG. 3 versus time for the dual actuator in a conventional optical drive.

FIG. 4 is a curve of velocity versus time for the dual actuator in a conventional optical drive. The horizontal axis of FIG. 4 represents the time, and the vertical axis of FIG. 4 represents the reference velocity of the dual actuator. When the time is at t0, the dual actuator starts to decelerate, and when the time is at t1, the dual actuator stops. Since the velocity variation of the dual actuator is very large, it causes the dual actuator unstable. In other words, when the optical pickup head moves close to the target track, the vibration occurs and causes focus loss. The research of reducing the focus loss and track count miss is still strongly needed.

SUMMARY OF THE INVENTION

It is an objective of the present invention to provide a long seek control system and method for an optical drive. The invention reduces the long seek time and avoids the vibration of the optical pickup head. Thus, the invention makes the optical drive more stable.

In accordance with the foregoing objective and other objectives of the present invention, the invention provides a long seek control system and method for receiving a target track and controlling a dual actuator of the optical drive. The location of the dual actuator is corresponding to the displacement of the dual actuator. The dual actuator is composed of a sled actuator and a fine actuator. The long seek control system includes a reference velocity mapping unit, a velocity estimator, and an electrical damper. The reference velocity mapping unit is used to receive the target track and a residual track count after subtraction by the actual track, and obtains a reference velocity for the dual actuator. The velocity estimator is used to receive the actual track, and output an estimated velocity. The result of the reference velocity being subtracted by the estimated velocity is corresponding to a sled control effort. The electrical damper is used to receive the sled control effort, and simultaneously receive the displacement of the dual actuator, so as to output a damping control effort to the fine actuator and reduce the vibration of the fine actuator during the long seek operation. In the reference velocity mapping unit, a reference velocity curve is used to describe the mapping relation between the residual track count and the reference velocity. The reference velocity curve includes a linear part and several quadratic parts with different quadratic functions.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The main features of the long seek control system and method in an optical drive of the invention are using the time optimal control method of the optimal control theory and designing a reference velocity with the time optimal profile in a reference velocity mapping unit, so as to reduce the seek time for seeking the track and reduce the instability when the dual actuator arrives the target track. Besides, the electrical damper is used to increase the damping effect to reduce the vibration for the optical pickup head.

By using the time optimal control method, the dual actuator can fast reaches the target track. When the time optimal control method is applied to the optical drive, the main issue to be considered is the vibration of the lens. When the vibration of the lens is effectively reduced, the performance of the system would be highly improved.

Figure 5:
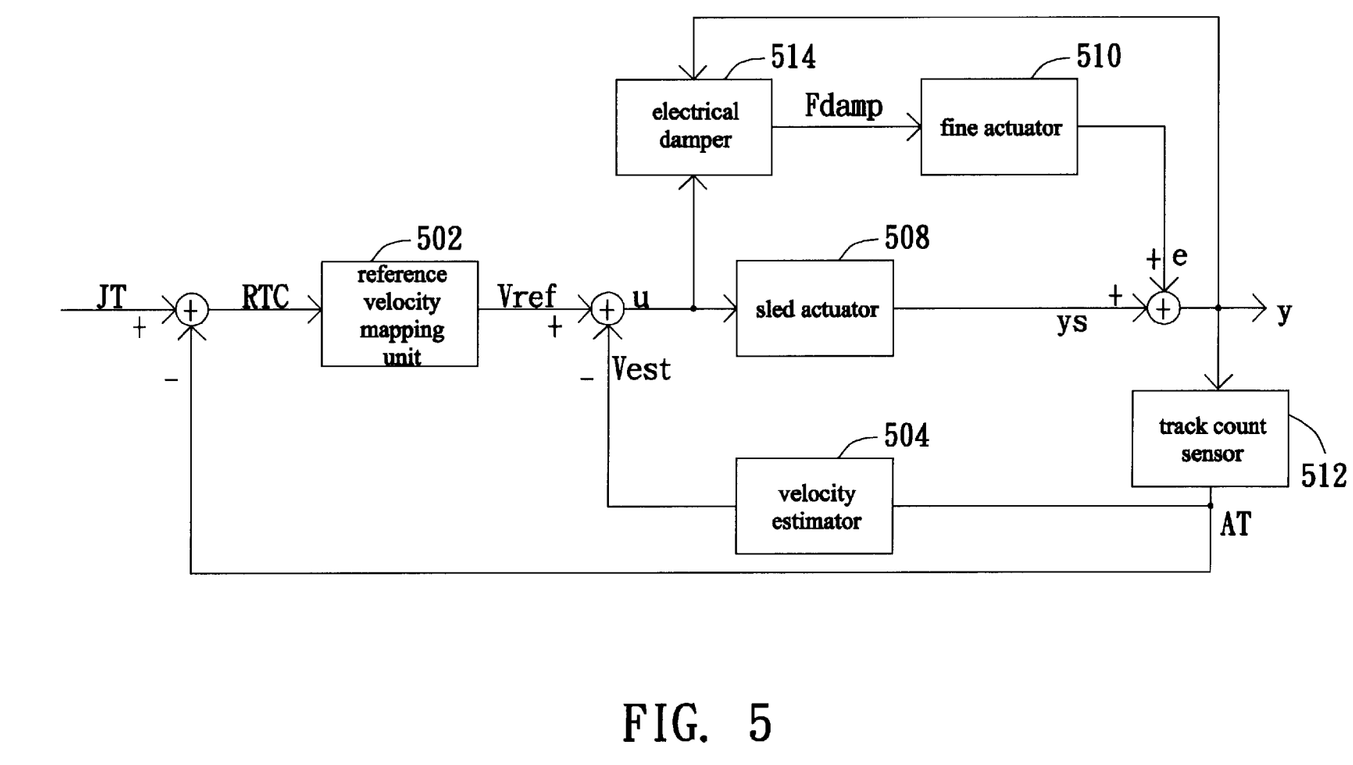
FIG. 5 is a block diagram of the long seek control system in an optical drive, according to the preferred embodiment of the invention.

FIG. 5 is a block diagram of the long seek control system in an optical drive, according to the preferred embodiment of the invention. As shown in FIG. 5, a residual track count RTC is obtained by subtracting the target track JT by the actual track AT of the optical pickup head. The RTC is inputted to the reference velocity mapping unit 502, which then outputs a reference velocity Vref of the optical pickup head. Moreover, after the actual tract AT is inputted to the velocity estimator 504, an estimated velocity Vest is obtained. The estimated velocity Vest is subtracted from the reference velocity Vref to obtain the sled control effort u, which is then outputted to the sled actuator 508, wherein the sled actuator 508 is used to move the sled.

In addition, the sled control effort u is inputted to the electrical damper 514. The electrical damper 514 also receives a displacement y of the dual actuator, and generates a damping control effort Fdamp, which is outputted to a fine actuator 510. The fine actuator 510 is used to move the lens (not shown in FIG. 5). The lens has a lens displacement e relative to the sled. A sum of the lens displacement e and a sled displacement ys is the displacement y of the dual actuator. A track count sensor 512 generates the actual tract AT according to the displacement of the dual actuator y. The track count sensor 512, for example, generates the actual track AT by the radio frequency zero crossing (RFZC) or tracking error zero crossing (TEZC) generated by the optical pickup head.

Figure 6:
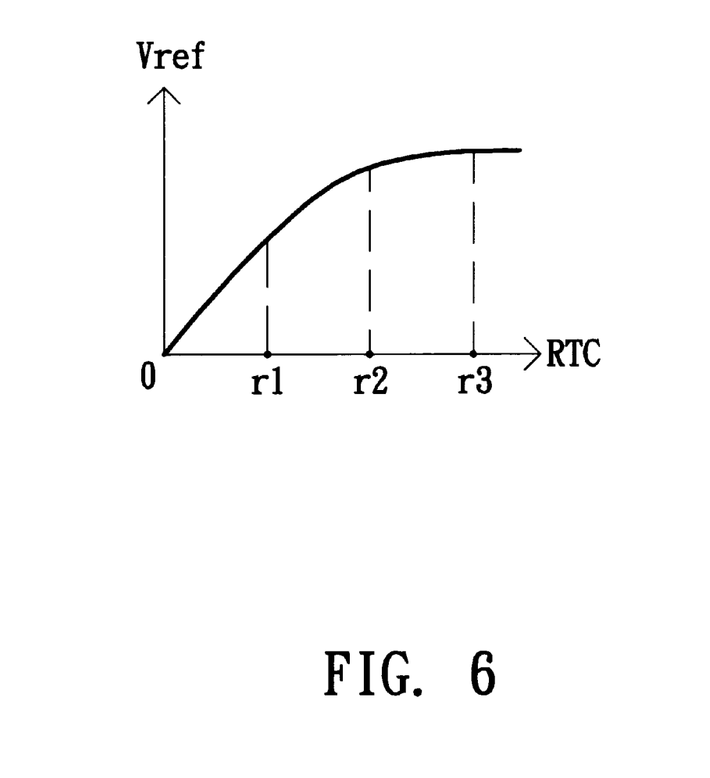
FIG. 6 illustrates a curve of reference velocity used in the reference velocity mapping unit in the long seek control system in FIG. 5, according to the preferred embodiment of the invention.

FIG. 6 is a curve of reference velocity used in the reference velocity mapping unit 502 in the long seek control system in FIG. 5, according to the preferred embodiment of the invention. In FIG. 6, the horizontal axis is the residual track count RTC and the vertical axis is the reference velocity Vref. The reference velocity curve used in the invention is divided into a linear part and several quadratic parts with different corresponding quadratic functions. As shown in FIG. 6, the reference velocity curve corresponding to the residual track count from zero to r1 is the linear part. The reference velocity curve corresponding to the residual track count RTC from r1 to r2 is a first quadratic functional part. The reference velocity curve corresponding to the residual track count from r2 to r3 is a second quadratic functional part, and the reference velocity curve corresponding to the residual track count greater than r3 is a third quadratic functional part.

Each part has a function shown as follows:

$Vref = m*RTC$, when $0 < RTC < r1$ (Eq.1)

$Vref = k*[(2*n*\alpha_1*RTC)^{1/2} - d1]$, when $r1 < RTC < r2$ (Eq.2)

$Vref = k*[(2*n*\alpha_2*RTC)^{1/2} - d2]$, when $r1 < RTC < r2$ (Eq.3)

$Vref = k*[(2*n*\alpha_3*RTC)^{1/2} - d3]$, when $r1 < RTC < r2$ (Eq.4)

In Eq.1 to Eq.4, m is a slop of the linear part, and k, d1, d2, and d3 are constants greater than 0, n is a actual mass of the sled actuator 508, $\alpha_1$, $\alpha_2$, and $\alpha_3$ are the acceleration discount factors and $\alpha_1 < \alpha_2 < \alpha_3$, $0 < \alpha_1$, $\alpha_2$, $\alpha_3 < 1$.

The values of m and k can be obtained from the characteristics of the control system. The values of r1, r2, r3, r4, k, d1, d2, and d3 can be obtained according to continuity of the equations Eq.1 to Eq.4. That is, the Eq. 1 and the Eq. 2 are set to be continuous, and the first differentiated equations of Eq.1 and Eq. 2 are also set to be continuous. In this manner, the parameters of r1 and d1 are obtained as $r1 = [(n*\alpha_1)/2](m*k)^2$, $d1 = [(n*\alpha_1*r1)]^{1/2}$. The values of r2, r3, r4, k, d1, d2, and d3 can be obtained by the similar method. It is not further described.

In FIG. 6, the acceleration discount factors of $\alpha_1$, $\alpha_2$, and $\alpha_3$ are reduced as the residual track count is reduced. A different acceleration discount factor is corresponding to a different accelerating value. When the acceleration discount factor is larger, the corresponding accelerating value is also larger. Thus, in FIG. 6, when the residual track count is greater than r3, the reference velocity curve employs the third quadratic function, which has the largest acceleration discount factor α3. In this situation, the decelerating velocity in this part is also the largest. The residual track count from r1 to r2 employs the first quadratic curve function that has the smallest acceleration discount factor α1. Thus, the decelerating velocity is also the smallest.

For example, when the dual actuator starts deceleration as the residual track count RTC is equal to r4 (r4>r3), it sequentially enters the third quadratic function part, the second quadratic function part, and the first quadratic function part, which respectively have the acceleration discount factors of α3, α2, and α1, so as to gradually reduce the accelerating velocity of the dual actuator.

Figure 7:
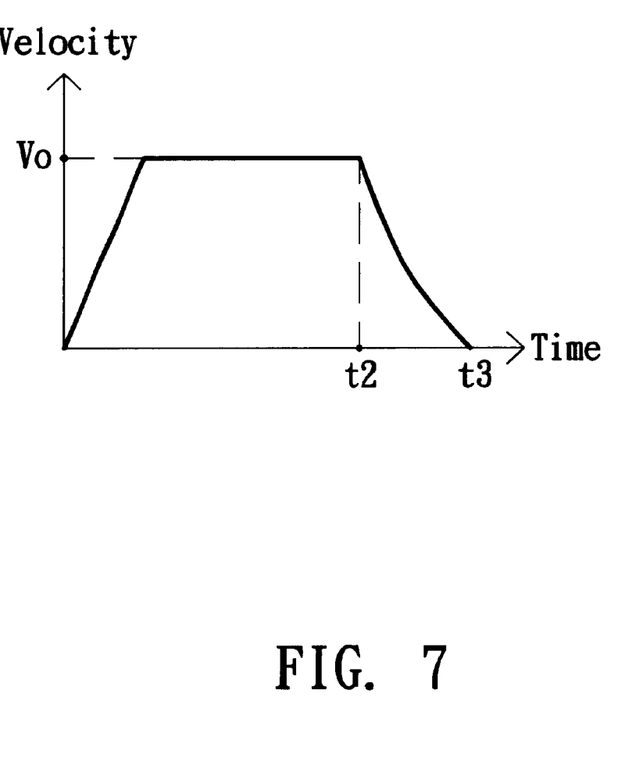
FIG. 7 illustrates a curve of time versus reference velocity in FIG. 6, according to the preferred embodiment of the invention.

FIG. 7 is a curve of reference velocity versus time according to the preferred embodiment of the invention. In FIG. 7, the horizontal axis is the time, and the vertical axis is the velocity of the dual actuator. Comparing with FIG. 4 of the conventional method using only one acceleration discount factor, such as α0, the velocity variation of the dual actuator in FIG. 7 is smaller than that of the dual actuator in FIG. 4 when the residual track count RTC is gradually reduced and the dual actuator gradually approaches the target track. Therefore, the invention can effectively avoid the instability of the optical pickup head in the conventional manner.

In details, assuming α0=α3 in FIG. 4 of the conventional method, when the velocity of the dual actuator is reduced from Vo to 0, the spending time is t1−t0. However, In FIG. 7 of the invention, when the velocity of the dual actuator is reduced from Vo to 0, it would take longer time of t3−t2 due to the accelerating velocity is gradually reduced. Even though the spending time is longer, the stability of the dual actuator is obviously improved.

Figure 8:
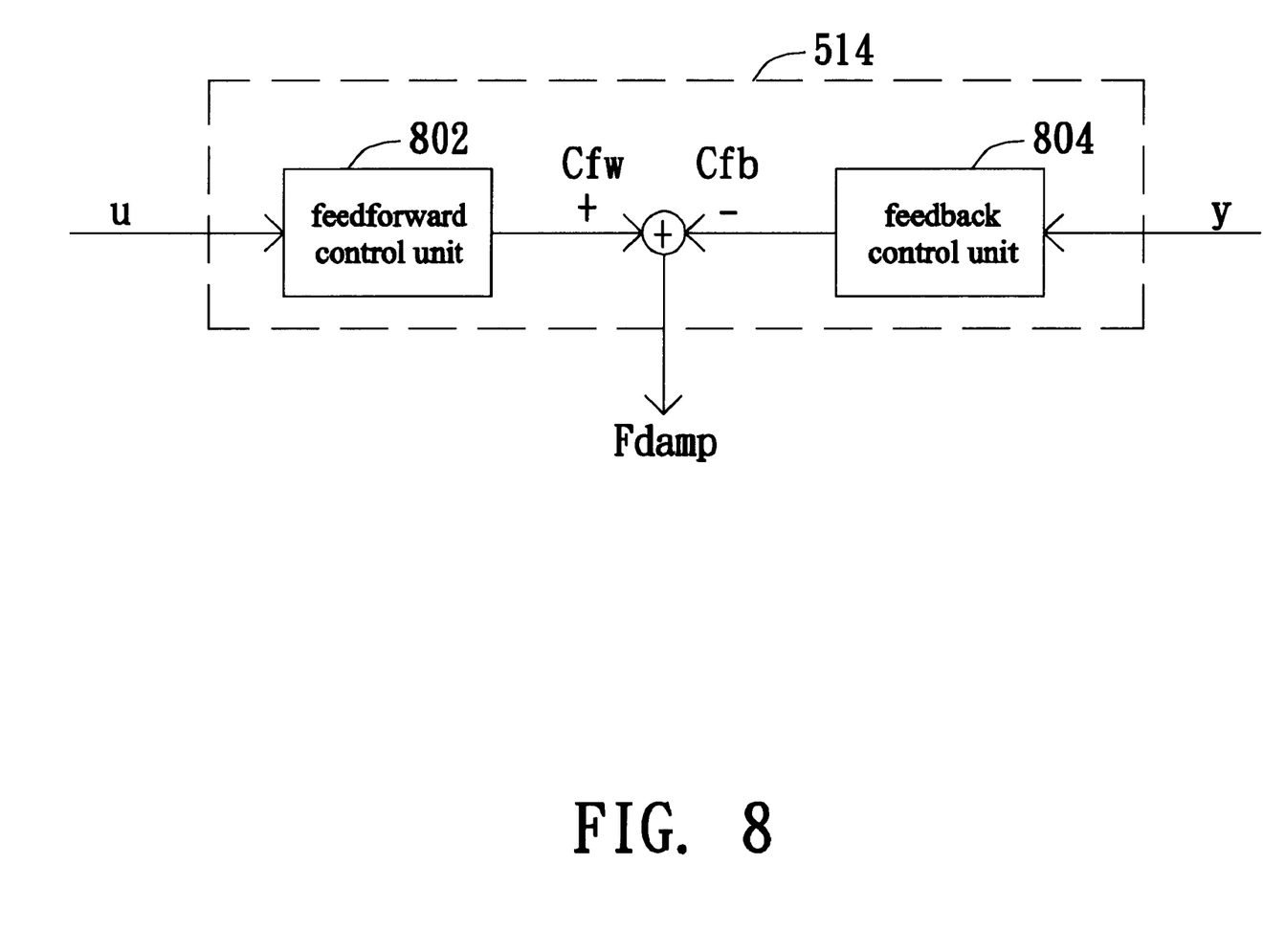
FIG. 8 is a block diagram of the electrical damper in FIG. 5, according to the preferred embodiment of the invention.

FIG. 8 is a block diagram of the electrical damper in FIG. 5. As shown in FIG. 8, the electrical damper 514 includes a feed-forward control unit 802, and a feedback control unit 804. The feed-forward control unit 802 is used to receive the sled control effort u and generated a feed-forward control quantity Cfw. The feedback control unit 804 receives the displacement y of the dual actuator to generate a feedback control quantity Cfb. The subtraction between the feed-forward control quantity Cfw and the feedback control quantity Cfb generates the damping control effort Fdamp.

The feed-forward control quantity Cfw is used to compensate the inertial force generated by the sled actuator 508 on the fine actuator 510, and the feedback control quantity Cfb is used to increase the damping factor of the fine actuator 510 to about 1. Before the inertial force is compensated, the inertial force causes the fine actuator 510 vibrating. When the inertial force is effectively compensated, the vibration of the fine actuator 510 is significantly reduced. In addition, when the electrical damper 514 is not used, the damping ratio ξ corresponding to the fine actuator 510 is too small (less than 0.5) since the fine actuator 510 is coupled to the sled actuator 508 through a spring coil. In this situation, the vibration is more severe. According to the invention, the feedback control unit 804 of the electrical damper 514 generates the feedback control quantity Cfb that effectively increases the equivalent damping ratio of the fine actuator 510 to about 1, thus reducing the vibration of the fine actuator 510.

Generally, the feed-forward control quantity Cfw can corresponds to a value after an integration and low pass filtering process on the sled control effort u. The feedback control quantity Cfb corresponds to the resulting value after differentiation of the displacement y of the dual actuator. The parameters of the electrical damper 514 can be obtained by a mathematic model of the fine actuator 510 and the sled actuator 508. And the parameters can compensate the inertial force and get the equivalent damping ratio of about 1.

Figure 9:
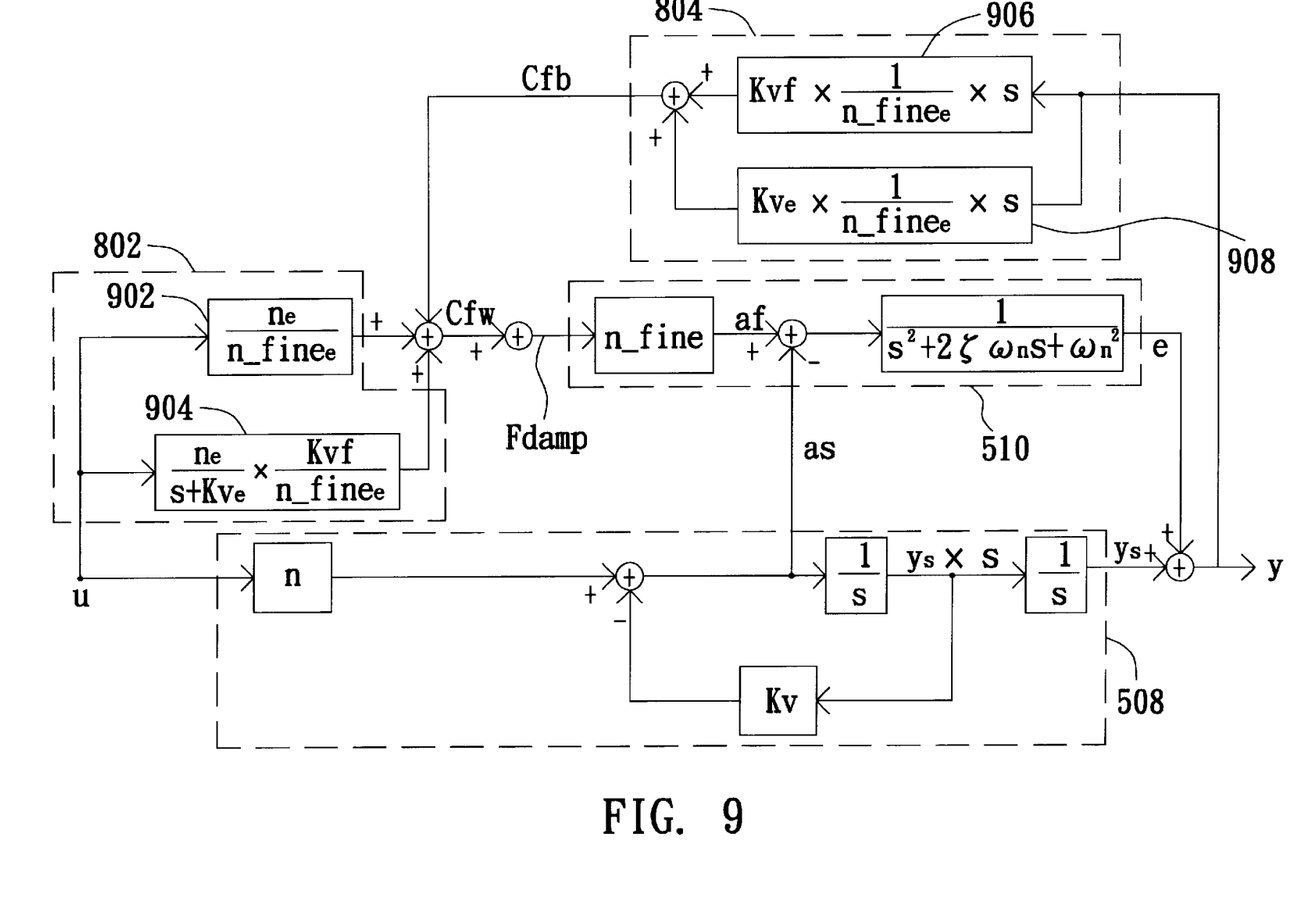
FIG. 9 is a block diagram of an electrical damper.

Referring now to FIG. 9, which is a block diagram of an electrical damper. A feed-forward control unit 802 of the electrical damper 514 is comprised of sub-units 902 and 904. The feedback control unit 804 of the electrical damper 514 is comprised of sub-units 906 and 908. The transfer functions of sub-units 902, 904, 906, and 908 are shown in FIG. 9. Besides, the mathematic model of the fine actuator 510 and the sled actuator 508 are also shown in FIG. 9.

In FIG. 9, n_fine is the actual mass of the fine actuator 510, and n_fine$_e$ is the estimated mass of the fine actuator 510. The value of n is the actual mass of the sled actuator 508, and n$_e$ is the estimated mass of the sled actuator 508. The value of Kv is the back-emf of the motor of the sled actuator 508. The value of $\omega_n$ is an natural frequency of the fine actuator 510. The values of Kvf and Kve are the characteristic parameters of the electrical damper 514. The interacting force af is as follows:

$$af = n_e \times \frac{n\_fine}{n\_fine_e} \times u + \frac{n}{s+Kv_e} \times \frac{Kvf}{n\_fine_e} \times n\_fine \times u -$$

$$(Kv_e + Kvf) \times \frac{n\_fine}{n\_fine_e} \times (e + y_s) \times s,$$

$$as = n \times u - Kv \times y_s \times s,$$

where assume $$\Delta = \left(-n + n_e \times \frac{n\_fine}{n\_fine_e}\right) \times u + \left(\frac{n_e}{s+Kv_e} \times u - y_s \times s\right) \times \frac{Kvf}{n\_fine_e} \times n\_fine +$$

$$\left(Kv - Kv_e \times \frac{n\_fine}{n\_fine_e}\right) \times y_s \times s,$$

and then, $$af - as = \Delta - (Kv_e + Kvf) \times \frac{n\_fine}{n\_fine_e} \times e \times s$$

Further more, the lens displacement e is:

$$e = \frac{\Delta}{s^2 + \left(2\zeta\omega_n + (Kv_e + Kvf)\frac{n\_fine}{n\_fine_e}\right)s + \omega_n^2} = \frac{\Delta}{s^2 + 2\zeta'\omega_n s + \omega_n^2}$$

By finding out the proper parameters of n$_e$, Kv$_e$, and Kvf to make the value of Δ be zero, then the parameters of n$_e$, Kv$_e$, and Kvf are obtained. The ζ' can be changed by adjusting the values of Kve and Kvf. If the value of ζ' is adjusted to about 1, it would be effectively to reduce the vibration of the fine actuator 510 in the long seek process.

Any control system and method applying the spirit of the control system and method as shown in FIG. 5 is within the protection scope of the invention. The control method of the invention is as follows. First, after performing a subtraction operation between the target track and the actual track, the residual track count can be obtained. A reference velocity for the dual actuator is generated according to the residual track count. Then, according to the actual track, an estimated velocity is generated, wherein the value of the reference velocity subtracted by the estimated velocity corresponds to a sled control quantity. Then, according to the sled control quantity and the displacement of the dual actuator, a damping control quantity is generated and the damping control quantity is outputted to the fine actuator to reduce vibration of the fine actuator in the long seek process. In the first step, it uses a curve of reference velocity to represent the mapping relation between the residual track count and the reference velocity. The curve of reference velocity includes a linear part, and several quadratic functional parts corresponding to different quadratic functions.

In summary, the invention provides a long seek control system and method used in an optical drive. The time for long seek operation is reduced, and the vibration of the optical pickup head is reduced, thus achieving good stability.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A long seek control system of an optical storage device for receiving a target track and controlling a dual actuator of the optical storage device, the dual actuator comprising a sled actuator and a fine actuator, the long seek control system comprising:
   a reference velocity mapping unit for receiving a residual track count, which is the subtraction of the target track and an actual track, and obtaining a reference velocity for the dual actuator;
   a velocity estimator for receiving the actual track and outputting an estimated velocity, the subtraction of the reference velocity by the estimated velocity corresponds to a sled control effort; and
   an electrical damper for receiving the sled control effort and simultaneously receiving the displacement of the dual actuator, so as to output a damping control effort to the fine actuator for reducing vibration of the fine actuator during a long seek process,
   wherein a reference velocity curve in the reference velocity mapping unit is used to represent a mapping relation between the residual track count and the reference velocity, and the reference velocity curve comprises a linear part and a plurality of quadratic parts corresponding to different quadratic function.

2. The system of claim 1, wherein the quadratic parts correspond to different acceleration discount factors, if a first residual track count corresponds to a first quadratic part, and a second residual track count corresponds to a second quadratic part, when the first residual track count is less than the second residual track count, the acceleration discount factor of the first part is less than the acceleration discount factor of the second quadratic part.

3. The system of claim 1, wherein the electrical damper comprises:
   a feed-forward control unit for receiving the sled control effort and generating a feed-forward control effort; and
   a feedback control unit for receiving the displacement of the dual actuator and generating a feedback control effort,
   wherein a damping control effort is equal to the subtraction of the feed-forward control effort and the feedback control effort.

4. The system of claim 3, wherein the feed-forward control effort corresponds to the value after an integration and low pass filtering process of the sled control effort.

5. The system of claim 3, wherein the feedback control effort corresponds to the value after differential process of the displacement of the dual actuator.

6. The system of claim 1, further comprising a track count sensor for sensing the actual track according to the displacement of the dual actuator.

7. A long seek control method for an optical storage device in a control system, the control system is used to receive a target track and control a dual actuator of the optical storage device, wherein the position of the dual actuator corresponding to the displacement of the dual actuator, the dual actuator comprising a sled actuator and a fine actuator, the long seek control method comprising:
   (a) performing a subtraction operation between a target track and an actual track to obtain a residual track count and generate a reference velocity according to the residual track count for the dual actuator;
   (b) generating an estimated velocity according to the actual track, wherein the subtraction of the reference velocity by the estimated velocity corresponds to a sled control effort; and
   (c) generating a damping control effort according to the sled control effort and the displacement of the dual actuator, wherein the damping control effort is outputted to the fine actuator to reduce the vibration of the fine actuator during a long seek process;
   wherein in the step (a), a reference velocity curve is used to represent a mapping relation between the residual track count and the reference velocity, and the reference velocity curve comprises a linear part and a plurality of quadratic parts corresponding to different quadratic functions.

8. The method of claim 7, wherein the quadratic parts correspond to different acceleration discount factors, if a first residual track count corresponds to a first quadratic part, and a second residual track count corresponds to a second quadratic part, when the first residual track count is less than the second residual track count, the acceleration discount factor of the first quadratic part is less than the acceleration discount factor of the second quadratic part.

9. The method of claim 7, wherein the control system comprises a reference velocity mapping unit, a velocity estimator and an electrical damper, wherein the reference velocity mapping unit is used to perform the step (a), the velocity estimator is used to perform the step (b), and the electrical damper is used to perform the step (c).

10. The method of claim 9, wherein the electrical damper comprises:
    a feed-forward control unit for receiving the sled control effort and generating a feed-forward control effort; and
    a feedback control unit for receiving the displacement of the dual actuator and generating a feedback control effort,
    wherein a damping control effort is equal to the subtraction of the feed-forward control effort and the feedback control effort.

11. The system of claim 10, wherein the feed-forward control effort corresponds to a value after an integration and low pass filtering process of the sled control effort.

12. The system of claim 10, wherein the feedback control effort corresponds to the value after differential process of the displacement of the dual actuator.

13. The system of claim 9, further comprising a track counting sensor for sensing the actual track according to the displacement of the dual actuator.

* * * * *